Sept. 13, 1966   E. G. SUKUP   3,272,480
METHOD AND APPARATUS FOR AERATING STORED GRAIN
Filed Oct. 26, 1964   2 Sheets-Sheet 1

INVENTOR
EUGENE G. SUKUP
BY
N. Robert Henderson
ATTORNEY

Sept. 13, 1966  E. G. SUKUP  3,272,480
METHOD AND APPARATUS FOR AERATING STORED GRAIN
Filed Oct. 26, 1964  2 Sheets-Sheet 2

INVENTOR
EUGENE G. SUKUP
BY
ATTORNEY

United States Patent Office 3,272,480
Patented Sept. 13, 1966

3,272,480
METHOD AND APPARATUS FOR AERATING STORED GRAIN
Eugene G. Sukup, Dougherty, Iowa, assignor to Sukup Manufacturing Co., Sheffield, Iowa, a corporation of Iowa
Filed Oct. 26, 1964, Ser. No. 406,385
9 Claims. (Cl. 259—111)

This invention relates generally to maintaining grain stored in conventional grain bins against overheating and spoilage, and more specifically the invention relates to an apparatus for agitating and moving the grain stored in any one bin.

The stockpiling of grain and other farm products of a granular or like nature has become a necessity even for the individual farmer, and the maintenance of the stored grain under the optimum beneficial storage conditions has also become a necessity. And although storage bins themselves have become more efficient, such as the provision of forced air through the bottom of the bin and upwardly through the grain, certain "hot spots" occur from time to time within the grain.

These hot spots occur due to the normal respiration processes of the plant life in the grain which results in the exuding of heat and moisture during the drying out of green produce and during long storage periods of closely piled produce.

To prevent the formation of such hot spots, this invention is directed. The invention accomplishes its purpose by first continually agitating the grain in a vertical path from the bottom of the bin to the top of the grain, by pulling the grain from the bottom upwardly toward the top thereof, by making an ever changing series of curved and straight radial sweeps—no one sweep retracing another sweep path, secondly by leveling the grain to make the bin's own drying operation more effective without increasing its capacity, and to maintain the grain in the most efficient condition, and thirdly by varying the vertical path to one angularly related thereto.

It is, therefore, an object of this invention to provide a new and novel grain aerating and leveling apparatus.

It is another object of this invention to provide an improved apparatus readily mounted in existing conventional grain bins for agitating and aerating the grain stored therein.

Yet another object of this invention is to provide a grain moving apparatus which makes a series of alternately curved and straight radial sweeps within a circular bin, with no new sweep retracing the path of an old sweep, theoretically.

Still another object of this invention is the provision of a grain agitating and leveling apparatus which includes a vertically suspended auger device, radially movable on a horizontally disposed means, and whereby the auger device is simultaneously rotatable about its own longitudinal axis and about the longitudinal axis of the means to give flexibility of operation to the vertical auger device.

It is another object of this invention to provide an apparatus capable of attaining the above designated objectives, which apparatus is economical to manufacture, simple and rugged in structure, and effective in operation.

Another object of this invention is to provide a new and novel method of agitating and of leveling grain. This method comprises the tumbling upwardly of the grain from bottom to top, simultaneously sweeping the tumbling action in a curved radial counterclockwise direction from the center of a circle outwardly, then sweeping the tumbling action straight radially inwardly without, and then repeating the sweeping action, theoretically without retracing a sweep.

These objects, and other features and advantages of this invention will become readily apparent upon reference to the following description and the accompanying drawings, wherein.

Figure 1:
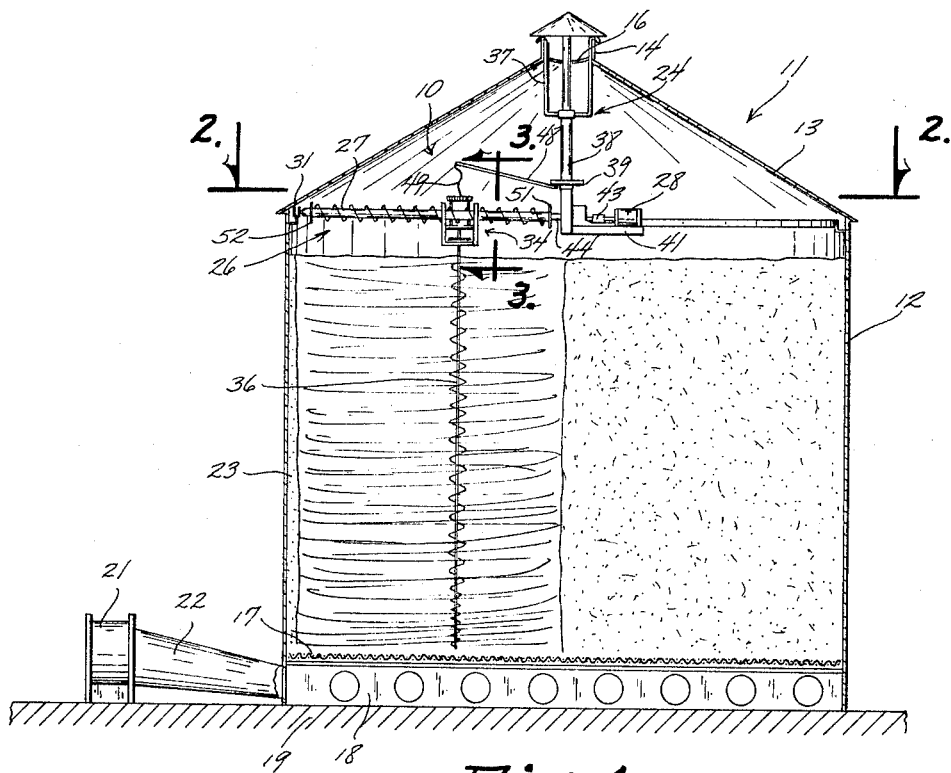
FIG. 1 is a sectional view of a conventional grain bin, showing the apparatus of this invention mounted therein.
Figure 2:
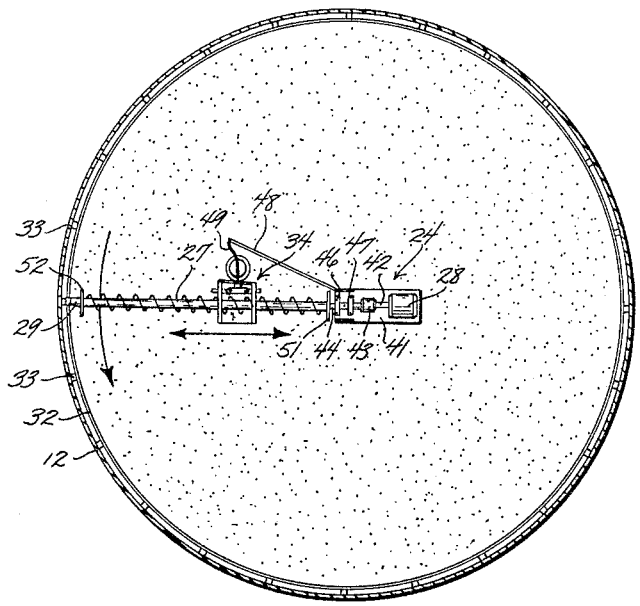
FIG. 2 is a plan view of the apparatus of FIG. 1 taken along the line 2—2 in FIG. 1.

Referring to the drawings, the grain moving apparatus of this invention is depicted generally at 10 in FIGS. 1 and 2, and is adapted for use inside a commercially available grain bin 11.

The bin 11 comprises a circular side wall 12 of galvanized steel having an umbrella-type roof 13 supported thereon, which roof 13 is provided with a ventilator cover 14. The ventilator may be adjustable to regulate the air flow therethrough, as is conventionally provided.

An opening 16 of a circular design is formed in the upper portion of the roof of 13, with a series of arcuate pockets (not shown) formed about the opening 16 (FIG. 2) by the metal joints of the roof panels. The purpose of these pockets will be set forth hereinafter. At the bottom of the grain bin 11, a circular perforated drying floor 17 is provided mounted on a steel understructure which includes a plurality of floor channels 18 (FIG. 2). The grain bin 11 as a whole is mounted on a concrete foundation 19.

For supplying fresh air internally of the bin 11 for passage through the grain therein, a fan 21 (FIGS. 1 and 2) is mounted on a portion of the foundation 19, and upon operation forces air through a transition unit 22 beneath the perforated floor 17.

Upon filling the grain bin 11 with grain 23 (FIGS. 1 and 2) quite often when the bin is about three-quarters full, grain pockets form which are sufficiently wet to prevent the passage of air therethrough. These wet pockets are usually termed "hot spots," and if not removed as by agitating or stirring the grain to provide air flow therethrough, result in spoilage of the grain.

To obviate such spoilage, and furthermore to maintain the grain level which in itself aids in preventing spoilage is the main purpose of the apparatus 10. Generally, the apparatus comprises the following: a support unit 24 (FIG. 1) attached to the roof 13; a conveyor unit 26 mounted on the support unit 24 and rotatable in a circular direction thereabout, the unit 26 including a horizontally disposed auger shaft 27 having helical flighting 30, and a reversible motor 28 therefor; a friction slip clutch 29 (FIGS. 4 and 5) having a wheel 31 attached thereto which is connected to the auger shaft 27; a circular track 32 for receiving the wheel 31 and mounted on a plurality of brackets 33 (FIG. 4) secured about the wall 12; a frame unit 34 (FIGS. 1 and 3) rotatably mounted on the auger shaft 27 so as to be simultaneously movable longitudinally of and circularly about the shaft 27; and a vertically disposed auger 36 (FIGS. 1 and 3) operably connected to the frame unit 34 and depending into the grain 23 for tumbling same, upon rotation of the auger 36, upwardly due to the flighting of the auger 36.

More specifically, the support unit 24 comprises a plurality of strap fasteners 37 (FIG. 1) the upper ends of which hook over the open upper edge of the cover 14. A bracket 38 depends centrally from the fasteners 37 and has a bushing device 39 at its lower end. The under side of the device 39 rotates horizontally 360° about the upper side thereof, and from the under side of which an L-shaped structure 41 depends.

Mounted on the upper horizontal side of the structure 41 is the reversible motor 28 (FIG. 2) the power shaft 42 of which extends into a gear box 43. The inner end 44 of the auger shaft 27 extends through a pair of bearing blocks 46 and 47 mounted on the structure 41 and into the gear box 43. Electric power is provided to the motor 28 and to a swivel switch mounted below the device 39. A rotatable boom 48 suspends an electric cable 49 to the frame unit 34 for supplying electricity thereto at all times during operation of the apparatus 10, and provides a means of electrically connecting the frame unit 34 to the motor 28 for a reason described hereinafter.

The conveyor unit 26 comprises the auger shaft 27, motor 28, gear box 44, and includes further an inner disc or plate 51 (FIGS. 1 and 2) secured to the shaft 27 adjacent the structure 41, and an outer plate 52 (see FIG. 4) secured to the shaft 27 adjacent the slip clutch 29. The clutch 29 is of a conventional type which effects a rotation of the wheel 31 in a given, constant direction in response to rotation of the shaft 27 in one direction, but which does not transmit rotation to the wheel 31 in response to rotation of the shaft 27 in the opposite direction.

Thus, in response to operation of the motor 28 to rotate the auger shaft 27 in a predetermined direction of rotation, the rotation of the shaft 27 is transmitted by the clutch 29 to the wheel 31; and by virtue of a frictional grip of the wheel on the track 32, the entire conveyor unit 26 and lower half of the support unit 24 rotate circularly about the bin 11 in a direction indicated by the curved arrow in FIG. 2. Then should the direction of drive of the motor 28 be reversed, the conveyor unit 26 would not travel until the motor 28 was reversed again back to its original direction of drive.

Referring primarily to FIGS. 3–6 inclusive, the frame unit 34 is specifically illustrated, it being noted that the upper end 53 of the vertical auger 36 is secured to a large pulley wheel 54 rotatably mounted on a base plate 56 of the frame unit 34. A pair of substantially U-shaped parallel members 57 and 58 have their lower ends secured to opposite sides of the base plate 56, and are spaced longitudinally of each other relative to the auger shaft 27 (see FIG. 4). Secured to the inside of each member at each upper portion thereof is a flat triangular plate 59 (FIGS. 3 and 4), and rotatably mounted on each plate 59 are a pair of laterally spaced, parallel rollers 61 and 62 the peripheral edges of which are in frictional engagement with the inner diameter surface of the auger shaft 27 between the flighting thereof.

A second, flat plate, parallel and comparable to the base plate 56 is also secured to and extended between the members 57 and 58. The plate 59 has an opening (not shown) formed therein for the upward extension therethrough of the auger upper end 53.

Figure 3:
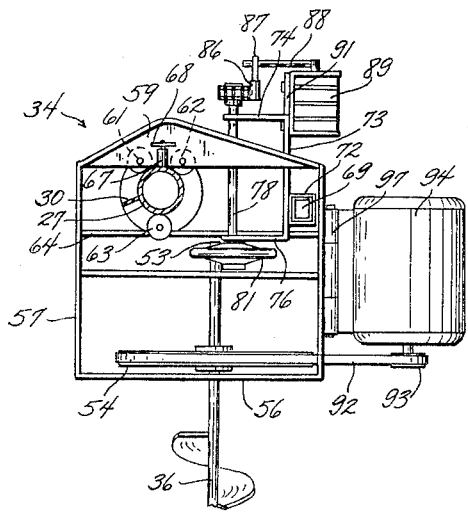
FIG. 3 is an enlarged, elevational view of one side of the vertical auger carriage, as taken along the line 3—3 in FIG. 1.

The two rollers 61 and 62 form a three point contact with the shaft 27 by the addition thereto of a third roller 63 (FIG. 3) mounted on a bar 64 extended laterally between the vertical legs of each member 57. As illustrated in FIG. 3, each roller 63 engages the underside of the shaft inner diameter surface. Thus, the frame unit 34 is rotatably mounted upon the shaft 27 and simultaneously with rotation of the shaft 27 could actually rotate 360° about the longitudinal axis of the shaft 27.

To provide for longitudinal movement of the frame unit 34 on the shaft 27 in response to rotation of the shaft 27, a pair of horizontally disposed rollers 66 and 67 (FIG. 4) are provided, each roller mounted on a flange 68 secured to each plate 59. The rollers 66 and 67 are spaced so that upon rotation of the auger shaft 27 in one direction one roller 66, for example, would be frictionally engaged by the flighting, whereby the frame unit 34 would be pushed along the shaft 27. Conversely, upon a rotation of the shaft in an opposite direction, the other roller 67 would be engaged and the frame unit 34 would be pushed in the opposite direction.

To effect a reversal of the motor 28 (FIG. 1) when the frame unit 34 reaches the outer end of the auger shaft 27 so that the frame unit is then moved backwardly toward the inner end 44 of the auger shaft 27, and vice versa, a reciprocal mechanism is provided on the frame unit 34. This mechanism comprises an elongated square bar 69 (FIGS. 3 and 5) extended parallel to the shaft 27 and reciprocally movably mounted in a pair of brackets 71 and 72. The brackets are supported on the members 57 and 58.

Figure 6:
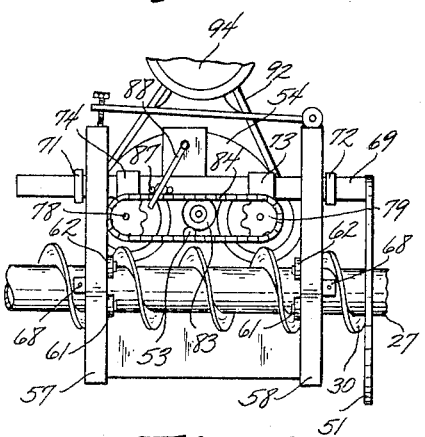
FIG. 6 is a view similar to FIG. 5, showing actuation of the control switch.

Mounted between the members 57 and 58 in logitudinally spaced relation on the bar 69 are a pair of U-shaped supports 73 and 74 having vertically spaced, horizontally extended upper and lower legs 76 and 77, respectively. Rotatably mounted on and inserted through the outer ends of each pair of legs 76 and 77 is a shaft 78 at the upper end of which is secured a sprocket 79, and at the lower end of which is secured a wheel 81 the outer peripheral surface of which comprises a rubber tread or the like. The wheels 81 are interconnected at their lower journals by a strap 82 on which is also rotatably mounted an idler wheel 83 continually engaged with one of the wheels 81, as best illustrated in FIGS. 4 and 6.

The sprockets 79 are interconnected by a continuous link belt 84 to which is attached a sleeve 86 having a vertically disposed bore (not shown) formed therein. Supported in the bore and by the sleeve 86 is a yoke member 87 the arms of which embrace both sides of a horizontally disposed actuating arm 88 extended outwardly from an electrical switch device 89.

Figure 5:
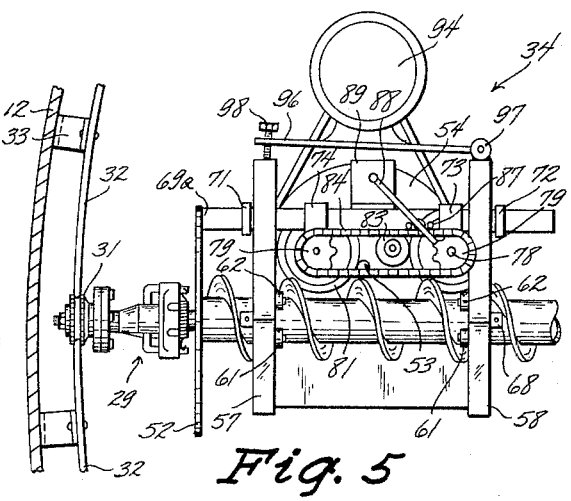
FIG. 5 is a plan view of the apparatus of FIG. 4, with the vertical auger drive motor mounted.
Figure 4:
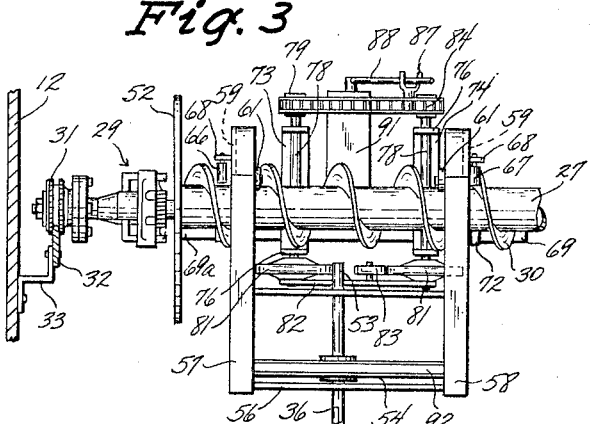
FIG. 4 is an enlarged, elevational view of the vertical auger carriage as viewed from the left in FIG. 3, with the motor deleted for illustrative purposes, and showing the outer end of the apparatus.

The switch device 89 is mounted on a bracket 91 which in turn is secured to the bar 69 intermediate the supports 73 and 74, as best shown in FIGS. 4 and 5. The switch device 89 is electrically connected via the cable 49 to a source of electrical energy and to the reversible motor 28.

Referring to FIG. 4, it will be seen that when the outer end 69a of the bar 69 is in engagement with the outer plate 52, the upper end 53 of the vertical auger 36 is in engagement with the left wheel 81. Before describing further, it should be noted that the vertical auger 36 is reciprocated via the pulley wheel 54 by a belt 92 (FIG. 3) driven by the drive wheel 93 of a motor 94 secured to a mounting plate 96 (FIG. 5). The mounting plate 96 is hingedly connected at 97 to one of the members 58, and is provided with an adjustable device 98 engageable with the other member 57 for maintaining a tight tension on the belt 92. Under normal circumstances of operation of the apparatus 10, the vertical auger motor 94 is reciprocating the vertical auger 36.

Thus, referring again to FIG. 4, upon engagement by the upper end 53 of the vertical auger 36 with the left wheel 81, rotation of the wheel 81 occurs effecting a like rotation of the sprocket wheel 79 thereabout. This rotatation in turn effects movement of the link belt 84 and thus longitudinal movement of the sleeve 86 whereupon the yoke member 87 frictionally engages the switch arm 88 to pivot same.

As best seen in FIGS. 5 and 6, the switch arm 88 is pivoted from one position in FIG. 5 to another position in FIG. 6 whereat the switch device 89 electrically actuates the reversible motor 28 to effect a reverse rotation of the auger shaft 27. This reverse rotation causes the frame unit 34 to be moved to the right as viewed in FIGS. 4–6 inclusive, whereupon the frictional engagement of the left wheel 81 in FIG. 4 with the vertical auger end 53 is broken. It will be noted that this frictional engagement was maintained all during the movement of the yoke member 87 and the switch arm 88 due to the continued rotation of the auger shaft 27 attempting to move the frame unit 34 to the left as viewed in FIG. 4. The arrangement is such that the actual movement of the yoke member 87 to actuate the switch device 89 via the arm 88 takes approximately three seconds, the relative coaction of all of the structure being such that the reversed direction of movement of the frame unit 34 takes place without binding of any parts. This action is enhanced by a built in flexibility of the vertical rollers 66 and 67 whereby they may actually "give" for at least the necessary three seconds.

When the frame unit 34 reaches the inner end of the auger shaft 27, and the bar 69 engages the inner plate 51, the mechanism is reciprocated to the left, as viewed in FIG. 4, relative to the remainder of the frame unit 34, such that the idler wheel 83 is engaged by the vertical auger end 53. Rotation of the idler wheel 83 effects a rotation of the right wheel 81, as viewed in FIG. 4, which in turn rotates via its shaft 78 the right sprocket wheel 79, moves the sleeve 86 and yoke member 87 from the left to the right as viewed in FIG. 4 to where the switch arm 88 is pivoted back to the original position of FIG. 5 to again reverse the motor 28. Thus, the frame unit 34 is again moved radially outwardly on the auger shaft 27.

Figure 7:
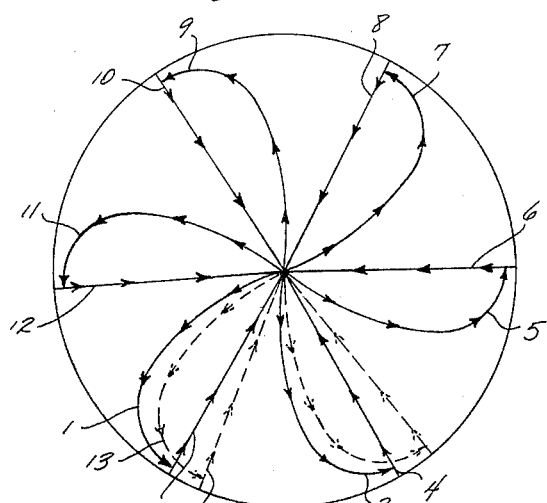
FIG. 7 is a diagram in plan view of the radial sweeping direction and movement of the vertical auger.

It may thus be seen by the description of the structure hereinbefore, that as the frame unit 34 is moved radially back and forth in response to rotation of the auger shaft 27, the vertical auger 36 is also rotating so as to move the grain 24 from the bottom of the bin 11 upwardly toward the top thereof. Referring now to FIG. 7, a plan view of the direction of movement of the frame unit 34 is shown. It will be remembered, that the slip clutch 29 is arranged to rotate the conveyor unit 26 in one direction, such as a counterclockwise direction when the frame unit 34 is moving from the center of the grain bin 11 toward the periphery thereof. Thus, the combined outward and counterclockwise movement of the frame unit 34 causes the unit 34, and thus the vertical auger 36, to sweep along a path indicated at 1 in FIG. 7. It will be seen that this path is of a curved nature. Conversely, when the frame unit 34 reaches the outer end of the auger shaft 27, and reversed rotation of the auger shaft 27 is effected, the slip clutch 29 renders the wheel 31 ineffective. Thus, as the frame unit 34 moves radially inwardly in response to rotation of the auger shaft 27, this rotation does not move the conveyor unit 26 forward. Thus, path 2 of the frame unit 34 is in a straight radial direction.

The succeeding paths 3 and 4, 5 and 6, 7 and 8, 9 and 10, and 11 and 12 are substantially identical to paths 1 and 2 due to the predetermined action of the apparatus 10. It will be noted, however, that paths 13 and 14 do not retrace paths 1 and 2, and this is true for all succeeding paths, theoretically.

The effectiveness of the curved and straight radial sweeps of the vertical auger 36 is tremendously increased by the flexibility of the frame unit 34 relative to the auger shaft 27. That is to say, due to the capability of the frame unit 34 to actually swing arcuately, if necessary, in a vertical plane normal to the horizontal plane, so to speak, of the auger shaft 27, the great stress and strain of forces on the bearings and shafts of the frame unit in particular, are relieved. Furthermore, the vertical auger 36 itself not only rotates on a vertical axis, but is found to lean away from the axis as it moves during the sweeps.

For example, when the frame unit 34 begins to sweep along path 1, the vertical auger 36 is substantially straight up and down. As one looks down on the auger 36 it is rotating counterclockwise. As the frame unit 34 moves toward the outer periphery of the bin 11, the auger 36 at its lower end leans away from or opposite to the curvature of the path as shown in FIG. 7. At the outermost end of the path 1, the vertical auger 36 has been found to lean away from the counterclockwise direction of movement as much as ten degrees from the vertical. Then, when the frame unit 34 moves radially inwardly along path 2, the vertical auger 36 straightens up substantially until at the inner end of the sweep of path 2, it leans slightly, or at about five degrees from the vertical, in the direction of movement of the conveyor unit 26. Thus, not only does the vertical auger 36 move in a vertically disposed manner radially outwardly and inwardly of the bin 11, but it simultaneously moves away from its vertical disposition as explained hereinbefore. This action on the part of the vertical auger 36 effects an agitation of the grain, and a tumbling of the grain, such as to prevent the formation of hot spots and also effects a continual leveling of the grain.

Although a preferred embodiment of this invention has been described hereinbefore, it is to be remembered that various modifications and alternate constructions can be made thereto without departing from the true spirit and scope of the invention as defined in the attached claims.

I claim:

1. A grain moving apparatus for operation within a grain bin having a roof and enclosed by a wall, said apparatus comprising in combination:

rotatable means including a vertically disposed, rotatable auger;

conveyor means for providing sole support for said rotatable means, said conveyor means rotatable about its longitudinal axis to move said rotatable means radially back and forth within the bin;

friction means operably connected to said conveyor means and to the bin wall for effecting horizontal movement of said conveyor means in a circular direction about the bin; and support means attached to the bin roof and rotatably supporting said conveyor means for movement in a horizontal plane.

2. A grain moving apparatus for operation within a grain bin having a roof and enclosed by a wall, said apparatus comprising in combination;

rotatable means including a vertically disposed, rotatable auger;

frame means to which said auger is rotatably connected;

conveyor means including a horizontally disposed, rotatable auger shaft for providing sole support for said frame means, said frame means movable longitudinally on said shaft in response to rotation of said shaft about its longitudinal axis;

friction means operably connected to said shaft and to the bin wall for effecting horizontal movement of said conveyor means in a circular direction about the bin; and support means attached to the bin roof and rotatably supporting said conveyor means for movement in a horizontal plane.

3. A grain moving apparatus for operation within a grain bin having a roof and enclosed by a wall, said apparatus comprising in combination:

rotatable means including a vertically disposed, rotatable auger;

frame means to which said auger is rotatably connected;

conveyor means including a horizontally disposed, rotatable auger shaft on which said frame means is rotatably mounted, said frame means movable longitudinally on said shaft in response to rotation of said shaft;

friction means including a circular track mounted on the wall, a wheel rotatably disposed upon said track, and including further a slip clutch device to which said wheel is connected, said device connected in turn to said shaft whereby rotation of the wheel, and rotation of said shaft in an opposite direction is ineffective relative to said wheel; and support means attached to the bin and rotatably supporting said conveyor means for movement in a horizontal plane.

4. A grain moving apparatus for operation within a grain bin having a roof and enclosed by a wall, said apparatus comprising in combination:

support means attached to the bin roof and suspended therefrom;

conveyor means mounted on said support means and rotatable in a circular direction thereabout, said conveyor means including an elongated auger shaft, said conveyor means including further a reversible motor connected to one end of said shaft;

circular track means mounted within the bin and adapted to operably receive the opposite end of said shaft, whereby said conveyor means is movable about the bin in response to rotation of said shaft; and rotatable means including a vertically disposed, rotatable auger mounted on said shaft, said auger swingable in a plane perpendicular to the longitudinal axis of said shaft, said rotatable means movable longitudinally on said shaft in response to rotation of said shaft.

5. A grain moving apparatus for operation within a grain bin having a roof and enclosed by a wall, said apparatus comprising in combination:

support means attached to the bin roof and suspended therefrom;

conveyor means mounted on said support means and rotatable in a circular direction thereabout, said conveyor means including an elongated auger shaft, said conveyor means including further a reversible motor connected to one end of said shaft;

circular track means mounted within the bin and adapted to operably receive the opposite end of said shaft, whereby said conveyor means is movable about the bin in response to rotation of said shaft;

frame means embracing said shaft and freely rotatable thereon, said shaft having a helical flighting engaged with said frame means, said frame means movable longitudinally on said shaft in response to rotation thereof; and a vertically disposed auger rotatably mounted on said frame means and swingable arcuate in response to rotation of said frame means.

6. A grain moving apparatus for operation within a grain bin having a roof and enclosed by a wall, said apparatus comprising in combination:

support means attached to the bin roof and suspended therefrom;

conveyor means mounted on said support means and rotatable in a circular direction thereabout, said conveyor means including an elongated auger shaft, said conveyor means including further a reversible motor connected to one end of said shaft;

slip clutch means connected to the opposite end of said shaft and having a wheel rotatable in response to rotation of said shaft in one direction, and maintained against rotation in response to rotation of said shaft in an opposite direction;

a circular track surrounding said conveyor means and upon which said wheel is frictionally mounted; and rotatable means including a vertically disposed, rotatable ouger mounted on said shaft, said auger swingable in a plane perpendicular to the longitudinal axis of said shaft, said rotatable means movable longitudinally on said shaft in response to rotation of said shaft.

7. A grain moving apparatus for operation within a grain bin having a roof and enclosed by a wall, said apparatus comprising in combination:

support means attached to the bin roof and suspended therefrom;

conveyor means mounted on said support means and rotatable in a circular direction thereabout, said conveyor means including an elongated auger shaft, said conveyor means including further a reversible motor connected to one end of said shaft;

slip clutch means connected to the opposite end of said shaft and having a wheel rotatable in response to rotation of said shaft in one direction, and maintained against rotation in response to rotation of said shaft in an opposite direction;

a circular track surrounding said conveyor means and upon which said wheel is frictionally mounted; and a vertically disposed auger rotatably mounted on said frame means and swingable arcuate in response to rotation of said frame means.

8. A grain moving apparatus for operation within a grain bin having a roof and enclosed by a wall, said apparatus comprising in combination:

support means attached to the bin roof and suspended therefrom;

conveyor means mounted on said support means and rotatably movable in a horizontal plane thereabout, said conveyor means including a horizontally disposed, radially extended, rotatable auger shaft, a reversible motor connected to one end of said shaft, a frame rotatably mounted on said shaft for movement in a vertical plane, said frame movable longitudinally on said shaft in response to rotation of said shaft, a power source mounted on said frame, switch means mounted on said frame and operably connected to said motor for selectively controlling the rotation of same, mechanism mounted on said frame and operable to actuate said switch means;

slip clutch means connected to the opposite end of said shaft and having a wheel rotatable in response to rotation of said shaft in one direction, and maintained against rotation in response to rotation of said shaft in an opposite direction;

means mounted on opposite ends of said shaft and engageable by said mechanism for operation of said mechanism;

a circular track surrounding said conveyor means and upon which said wheel is frictionally mounted; and a vertically disposed auger rotatably mounted on said frame means and swingable arcuate in response to rotation of said frame means.

9. The method of moving grain in a storage bin to aerate same comprising the following steps:

pushing the grain from the bottom of the bin upwardly toward the top thereof;

moving the grain, as it is being pushed up, from the center of the bin outwardly toward the periphery of the bin in a first sweeping path moving circularly in one direction;

moving the upwardly pushed grain from the periphery of the bin in a straight, radial path toward the center of the bin;

moving the upwardly pushed grain from the center of the bin outwardly toward the periphery of the bin in a second sweeping path arcuately spaced from said first path; and sequentially repeating said path movements without retracing prior paths.

References Cited by the Examiner

UNITED STATES PATENTS 3,156,541  11/1964  Kalke _____ 259—111
3,198,493  8/1965  Sukup _____ 259—111

WALTER A. SCHEEL, *Primary Examiner.*

R. W. JENKINS, *Assistant Examiner.*